United States Patent [19]

Dilling et al.

[11] Patent Number: 4,715,864
[45] Date of Patent: Dec. 29, 1987

[54] LIGNOSULFONATE SALTS FOR USE AS DYESTUFF ADDITIVES

[75] Inventors: Peter Dilling, Isle of Palms; Susan L. Schlegel, Goose Creek, both of S.C.

[73] Assignee: Westvaco Corporation, New York, N.Y.

[21] Appl. No.: 859,384

[22] Filed: May 5, 1986

[51] Int. Cl.$^4$ ............................................. C09B 67/00
[52] U.S. Cl. ......................................... 8/557; 530/505
[58] Field of Search ............................. 530/505; 8/557

[56] References Cited

U.S. PATENT DOCUMENTS 2,594,302  4/1952  Ehrensperger ..................... 530/505
3,412,018  11/1968  Monzie ........................... 530/505 X
3,455,895  7/1969  Niilo-Rama et al. ............... 530/505

Primary Examiner—Earl Nielsen
Attorney, Agent, or Firm—Terry B. McDaniel; Richard L. Schmalz

[57] ABSTRACT

An improved lignosulfonate salt composition particularly suited for use as a dyestuff dispersant in azo dyestuff-containing dye systems wherein a sulfonated lignin salt is modified by ion-exchange reaction with an amine compound having a lower dissociation constant and pKa than the dissociation constant and pKa of the cation of the sulfonated lignin salt to provide a dispersant for an azo dyestuff which causes less color reduction of the azo dyestuff than the unmodified sulfonated lignin salt dispersant. More specifically, a sulfonated lignin salt having a relatively high pKa, such as a sodium or ammonium salt, is reacted with a lower pKa amine compound, such as triethanolamine, diethanolamine, or monoethanolamine, in amounts from about 0.1 to 2.5 moles per 1,000 grams of lignin to produce an ion exchange reaction between the sodium and ammonium cations and the amine cations to stabilize the lignin dispersant and inhibit its tendency for azo dye reduction in azo dye-containing dye systems.

17 Claims, No Drawings

LIGNOSULFONATE SALTS FOR USE AS DYESTUFF ADDITIVES

The present invention relates to a method of manufacture and use of an improved lignosulfonate salt composition as a dyestuff additive, and, more particularly, to such a lignosulfonate salt composition particularly suited for use as a dispersant in dye systems containing an azo dyestuff.

BACKGROUND OF THE INVENTION

Dyestuff compositions are widely employed to color natural and synthetic fibers. Such compositions generally contain, in addition to the dyestuff component, a dispersant for the dyestuff. In the dyestuff composition, the dispersant generally serves three basic functions:

(1) it assists in reducing the dye particles to a fine size in a grinding operation;
(2) it maintains the dispersing medium for the dyestuff; and
(3) is serves as a diluent.

Sulfonated compounds are commonly employed as dye dispersants and may be obtained from two major sources, sulfonated lignins from the wood-pulping industry prepared from the lignin by-products of a sulfite or a kraft pulping process, and naphthalene sulfonates derived as by-products from the petroleum industry. The advantages of employing sulfonated lignins as dispersants in dyestuff compositions are due to their unique physical properties which include good capability to many dye systems, outstanding dispersant characteristics at ambient and elevated temperatures, and availability. There are, however, certain disadvantages in employing such lignins, whether sulfite process-derived lignins, or sulfonated kraft lignins, as dipersants. Negative factors in the use of such lignins as dyestuff additives have in the past related to problems of foaming, high pH, fiber staining, poor heat stability, and the tendency of sodium and ammonium salts of the sulfonated lignins to cause some color reduction of the sensitive azo dyestuffs employed in the dyeing industry.

Technological developments have resulted in methods and processes to modify sulfonated lignins to reduce many of the negative aspects of their use as dispersants, without adversely affecting their desirability as a dyestuff dispersant. The following patents are exemplary of modifications and processes employed in the production of lignin materials to improve their use in dyestuff systems: U.S. Pat. Nos. 4,001,202 to P. Dilling et al.; 4,184,845 to S. Y. Lin; 4,131,564 to P. Dilling; 3,156,520 to L. A. Blaisdell; 3,094,515 to K. F. Keristead et al; 3,726,850 to Detroit; 2,680,113 to E. Adler et al.; 3,769,272 to Hintz; 3,841,887 to Falkehag et al.; 4,355,996 to P. Dilling et al; 4,308,203 to Lin; 4,454,066 to Dilling et al.; 4,534,771 to Dilling; and 4,546,173 to Dilling.

Because of their availability, lignin by-products of a kraft wood-pulping process in the paper-making industry are widely employed as dyestuff dispersants, and a commonly used form of dye dispersant is the sodium salt of a sulfonated lignin. The recovery, chemical modification, and use of such sulfonated lignin sodium salts are described in commonly assigned co-pending U.S. patent application Ser. No. 06/657,973 U.S. Pat. No. 4,590,262 and Ser. No. 06/819,600.

Lignin is commonly obtained from the spent pulping liquors of a pulping process in the paper-making industry, wherein lignocellulosic materials, such as wood, straw, corn stalks, bagasse, and the like, are processed to separate the cellulosic pulp from the lignin. In a sulfite pulping process, the lignin in the wood undergoes hyrolysis and in situ sulfonate allowing it to become soluble. A variety of commercial sulfite processes exist today. Among these are the magnesium-based pulping process, the calcium-based process, the ammonia-based process, the soda, the neutral, the bisulfite, and acid sulfite processes. In a kraft pulping process, lignin is obtained from the pulping liquor, known as black liquor, by subjecting the same to the effects of strong alkali, such as sodium hydroxide, to solubilize the lignin component in its sodium salt form. The sodium salt form of the lignin can then be separated from the cellulose and recovered from the pulping liquor by acidification. Acidification of the black liquor, such as by introduction of carbon dioxide, from a pH of around 13 to a pH of about 9.5, converts the phenolic hydroxide groups on the lignin molecule from their ionized form to their free phenolic, or acidic, form in which they precipitate. The precipitated lignin may be further acidified by the addition of acid, such as sulfuric acid, to a low pH, where it is water washed to remove undeired inorganic salts and other impurities.

In order to enhance the solubility of the lignin over a larger pH range, and thus facilitate its use as a dye dispersant, a kraft process lignin may be sulfonated by reaction with a sulfur-containing compound to a variety of specific degrees. Lignin salts obtained from a kraft, soda, or other alkaline process are not recovered as a sulfonted product, but may be sulfonated by reacting the lignin with suitable materials. Kraft process lignins which are sulfonated by attachment of sulfonic acid groups to the side chain of the lignin are commercially available and certain of them are sold under the trademark POLYFON® by Westvaco Corporation of Charleston, S. C.

Kraft process lignins may also be sulfonated by attachment of sulfonic acid groups on the aromatic nuclei of the phenolic group of the lignin by a methylolation and sulfonation reaction. Such sulfomethylated lignins are commercially available and produced under the trademark REAX® by Westvaco Corporation. Kraft process lignins recovered from black liquor also contain catechol components in the lignin molecule which also react with components of a sulfonation or a sulfomethylation reaction.

Sulfomethylation may be carried out by simultaneous reaction of an aldehyde and a sulfur-containing compound with the lignin, or sequentially after the aldehyde methylolation step and water wash, by addition of a bisulfite or sulfite compound to provide an effective amount of sulfonate groups to give the desired water-solubility in moderately acid and higher pH solutions. The degree of sulfonation of a lignin is proportional to its solubility in an aqueous solution and the viscosity of the lignin. Sulfomethylation of lignin by-products are disclosed in U.S. Pat. No. 2,680,113 to Adler et al.

Recently, it has also been proposed to produce an ammonium salt of a sulfomethylated lignin from the lignin by-product of a kraft pulping process, as well as an amine salt of such a sulfomethylated lignin, for use as dyestuff additives and dispersants. Such products and their methods of manufacture are disclosed in commonly assigned co-pending U.S. patent application Ser. No. 06/679,901 now U.S. Pat. No. 4,642,336 and Ser. No. 06/783,781, respectively.

As aforementioned, although sodium salts of sulfonated lignins are widely employed and are effective in many applications as a dyestuff dispersant, they have a tendency to reduce the color intensity of dyestuff systems employing sensitive azo dyestuffs. Ammonium salts of sulfomethylated lignin also cause color reduction in azo dyestuff-containing dye systems, although to a lesser extent.

BRIEF OBJECTS OF THE PRESENT INVENTION

It is an object of the present invention to provide an improved dye system employing an azo dyestuff and a modified salt of a sulfonated lignin as a dispersant therein which has less color reduction of the azo dyestuff than systems employing unmodified lignins of the prior art.

It is a further object of the invention to provide a method of producing a modified sulfonated lignin salt composition for use as a dyestuff dispersant which has reduced tendency to cause color reduction of azo dyestuff-containing dye systems.

It is another object of the present invention to provide an improved sulfonated lignin salt composition particularly suited for use as a dispersant in a dye system.

It is still another object to provide an improved dye composition containing an azo dyestuff and a modified sulfonated lignin salt composition as an additive therein.

BRIEF SUMMARY OF THE INVENTION

The present invention comprises a method of manufacture and use of an improved lignosulfonate salt composition as a dyestuff dispersant, in particular, in dye systems employing an azo dyestuff. A sulfonated lignin salt containing a cation having a relatively high dissociation constant and pKa is modified by addition of an amine compound having a lower dissociation constant and pKa to provide a dispersant for azo dyestuff compositions having less tendency to reduce the color of the azo dyestuff than the unmodified sulfonated lignin salt. More particularly, it has been found that an amine having a relatively low pKa, e.g., triethanolamine, diethanolamine, monoethanolamine, can be added in amounts from about 0.1 to 2.5 moles per 1,000 grams of lignin to a relatively higher pKa sulfonated lignin salt, e.g., a sodium or ammonium salt, such that when used as a dispersant in an azo dyestuff-containing dye system, there is less color reduction of the azo dyestuff than is the case in the use of the unmodified dispersant therewith.

Dye dispersants consisting of sodium or ammonium salts of sulfonated lignins modified by the addition of an amine compound having a pKa lower than the pKa of phenolic groups in the lignin reduces the tendency of the dispersant to decrease the color intensity of the azo dyestuff in the dye system. It is impossible to accurately state the exact pKa of the phenols, as they are known to exhibit different pKa values and these values are governed by the nature of the phenol and its neighboring functional group. The lower pKa amine compound may be added to the higher pKa sulfonated lignin salt to form a ion-exchange reaction therewith before its addition as a dispersant to the dyestuff composition, or simultaneously with its addition to the dyestuff to be employed in the dyeing operation.

DETAILED DESCRIPTION OF PREFERRED EMBODIMENTS

The present invention comprises the modification of a sulfonated lignin salt dispersant in which the cation of the salt has a relatively high pKa, such as a sodium lignsulfonate salt, by the addition of an amine compound having a relatively lower pKa.

As is well known, chemical substances, such as electrolytes, have the capability of disassociating into two or more ions, to some extent, in water, and the equilibrium constant for the disassociation is termed the dissociation, ionization, or acidity constant of the electrolyte, and is given the symbol Ka. The degree of disassociation, or ionization, of a particular compound may be expressed in its cation, or acid, disassociation constant by the formula $$Ka = \frac{[H^+][A^-]}{[HA]}.$$

The numerical value for the ionization or dissociation constant may be further expressed in more simplified numbers by a pKa value, as $pKa = pH + \log[HA] - \log[A^-] = \log(1/Ka)$. The following table lists ionization constants and pKa values of various amines:

| Amine Type | pKa | Ionization Constant |
|---|---|---|
| Diethylamine | 10.93 | $1.17 \times 10^{-11}$ |
| Triethylamine | 10.89 | $1.35 \times 10^{-11}$ |
| Monoethanolamine | 9.60 | $2.51 \times 10^{-10}$ |
| Diethanolamine | 8.88 | $1.32 \times 10^{-9}$ |
| Triethanolamine | 7.82 | $1.51 \times 10^{-8}$ |
| Ammonium | 9.26 | $5.5 \times 10^{-10}$ |

Theoretically, therefore, ammonium lignosulfonates could be stabilized by addition of an amine having a pKa value of less than 9.26.

It has been found that physical additions of an amine compound having a relatively lower pKa, e.g., triethanolamine, to a standard higher pKa lignosulfonate salt, e.g., a sodium salt lignin, will significantly alleviate the reduction behavior of the lignin towards the sensitive azo dye structures. The addition of the amine compound operates on established ion exchange principles with the higher pKa lignosulfonate salt such that the higher pKa cation, e.g., sodium, and the amine cation will re-arrange to equilibrate over time in a predictable association pattern. The exact re-arrangement and equilibration of the lignosulfonate salt composition depends on the ratio of both cations in the system, the pH, the dilution, and the ionization constants of the cations in question. When the amine associates with the lignin, lignin oxidation is inhibited and hence so is azo dye reduction.

Laboratory analyses have shown that when a lower pKa amine is added in amounts from about 0.1 to 2.5 moles (based on 1,000 grams of lignin) to a higher pKa lignosulfonate salt, the lignin dispersant system is stabilized to an extent that azo dyestuff structures retain most of their color integrity at the lower end of the dyeing pH spectrum, e.g., pH 4 to 5. Reductive effects exist at higher pH values, but to a lesser extent.

The cation equilibration and ion exchange reaction of the present invention is exemplified, utilizing a sulfomethylated lignin sodium salt and triethanolamine, by the following equation:

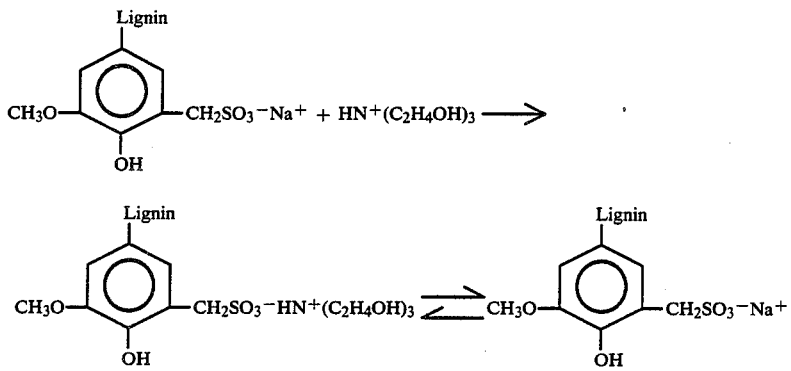

As previously mentioned, sulfonation of a recovered lignin by use of a sodium or ammonium salt of a sulfur-containing compound also produces an ionization reaction with catechol components of the lignin, with the more acidic of the hydroxyl groups of the catechol components being ionized with the cation of the reaction compound. The cation equilibrium and ion exchange reaction of the present invention which occurs on the catechol component is illustrated, utilizing a lignin sodium salt and triethanolamine, by the following equation:

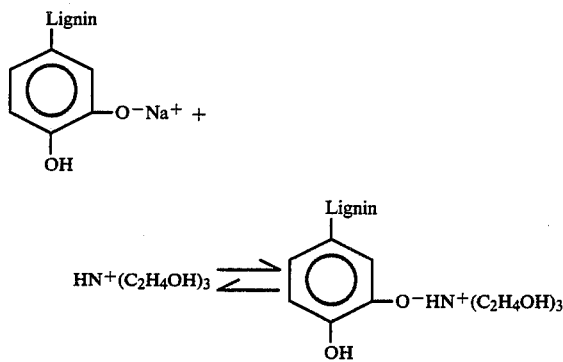

The modified sulfonated lignin salts of the present invention may be prepared from lignin salt by-products of both the kraft and the sulfite pulping processes commonly employed in the paper-making industry. Although the present invention has particular application and use in modification of the sodium-based lignosulfonate salts most commonly used as dye dispersants, the invention broadly has appliction to a lower pKa amine modification of any higher pKa lignosulfonate salt which is to be used as a dispersant for dyestuffs containing a sensitive azo dye component. Although the addition of amine compounds in molar amounts greater than about 2.5 may be employed in modification of the higher pKa lignosulfonate salts, such would not normally be the practice due to the added costs not justifying the appreciable increase in azo dye reduction achieved by such additional amounts of amine compound.

The effectiveness of modified products of the present invention to alleviate azo dye reduction tendencies of standard lignosulfonate salt dispersants in azo dyestuff systems are illustrated by testing for azo dye reduction of selected dye compositions containing azo dye components.

Color degradation tendencies were determined in accordance with an azo dye color reduction test procedure wherein a standard diazo dispersed dye slurry is prepared by mixing one gram of the azo-containing dyestuff in one liter of distilled water. One gram of the lignin salt composition to be tested and compared is placed into 100 ml. of water and 100 ml. of the dye slurry is added thereto. The pH is adjusted to 5.0 to 5.5 and 5 grams of a prescoured Dacron (Type 54) yarn skein is added and placed in a Renigal Dye Control Machine, Model PR, which is heated to 80° C. After 15 minutes, the temperature is raised to 130° C. and held at their temperature for 45 minutes (15 minutes is required to reach the temperature of 130° C.). At the end, the autoclave is cooled and the skein removed, washed with tap water, and dried. Color reduction is determined by reflectance measurements utilizing a photoelectric reflection meter (Model 610) manufactured by the Photovolt Corporation of New York. The degree of color reduction is calculated on the basis of reflectance values and is expressed in percent color loss.

Standard low and medium sulfonated sodium salts of sulfomethylated lignin by-products of a kraft pulping process (REAX 85 and REAX 910, products of Westvaco Corporation prepared by recovery, methylolation, and sulfonation as described hereinabove), and a sodium salt of a sulfonated lignin by-product of a sulfite pulping process (Vanisperse) CB, a product of Borregaard of Norway) were prepared. Samples of these lignin salts were modified by addition of varying molar amounts of amine compounds at varying pH levels and tested by the above laboratory procedure for azo dye reduction. The results there of were compared with standard unmodified samples of the products. The results of the comparisons are set forth in the following tables wherein the higher values of percentages reported equate to higher degradation of color

| | THE EFFECT OF PHYSICAL AMINE ADDITION TO VARIOUS LIGNOSULFONATES ON AZO DYE REDUCTION OF CI BLUE 79 DYESTUFF (LIGNIN RATIO TO DYE = 2 g/0.1 g) | | | |
|---|---|---|---|---|
| | REAX 85 (%) | REAX 85 + 0.5 mole TEOA (%) | REAX 85 + 1.0 mole TEOA (%) | REAX 85 + 2.1 mole TEOA (%) |
| pH 4 | 18 | 12 | 12 | 11 |
| pH 5 | 20 | 14 | 13 | 11 |
| pH 6 | 33 | 15 | 13 | 12 |
| pH 7 | 70 | 31 | 14 | 12 |
| pH 8 | 92 | 75 | 34 | 28 |

-continued

THE EFFECT OF PHYSICAL AMINE ADDITION TO
VARIOUS LIGNOSULFONATES ON AZO DYE
REDUCTION OF CI BLUE 79 DYESTUFF
(LIGNIN RATIO TO DYE = 2 g/0.1 g)

|  | REAX-910 (%) | REAX-910 + 1.0 mole TEOA (%) | REAX-910 + 1.0 mole DEOA (%) | REAX-910 + 1.0 mole MEOA (%) |
| --- | --- | --- | --- | --- |
| pH 4 | 22 | 13 | 15 | 16 |
| pH 5 | 32 | 15 | 20 | 36 |
| pH 6 | 85 | 28 | 63 | 83 |
| pH 7 | 98 | 62 | 82 | 92 |
| pH 8 | 100 | 92 | 99 | 99 |

|  | VANISPERSE CB (%) | VANISPERSE CB + 1 Mole TEOA (%) | VANISPERSE CB + 1 Mole DEOA (%) |
| --- | --- | --- | --- |
| pH 4 | 35 | 25 | 27 |
| pH 5 | 40 | 28 | 28 |
| pH 6 | 45 | 33 | 35 |
| pH 7 | 52 | 34 | 37 |

TEOA = triethanolamine (7.82 pKa value)
DEOA = diethanolamine (8.88 pKa value)
MEOA = monoethanolamine (9.6 pKa value)

Therefore, reductions in color degradation can be achieved by addition to sodium lignosulfonates with various amines having pKa values of 9.6 or less.

Evidence that this amine stabilization of lignosulfonate phenomenon is observed in azo dyestuffs generally is provided by azo dye reduction tests with Orange 44 and Red 88 dyestuffs comparing a sodium salt of sulfomethylated lignin (REAX 85) modified by addition of 1 mole of triethanolamine and an unmodified REAX 85 product at pH 5. The results are provided in the following table:

| DYESTUFF | AZO DYE REDUCTION (at pH 5) |
| --- | --- |
| CI DISPERSE Orange 44 |  |
| REAX 85 | 26% |
| REAX 85 + 1.0 mole TEOA | 14% |
| CI DISPERSE RED 88 |  |
| REAX 85 | 14% |
| REAX 85 + 1.0 mole TEOA | 3.5% |

Lignin to dye ratio = 1 g/0.1 g

Samples of a sodium salt of a sulfonated lignin product (POLYFON O, a product of Westvaco Corporation) wherein sulfonation occurs in the lignin side chain were prepared and modified by addition of 1 mole of triethanolamine, prepared at difference pH levels, and compared with an unmodified POLYFON O sample. The samples were tested, as described above, for azo dye reduction with CI Blue 79 Dyestuff. The test results thereof are expressed in the following table:

| AZO DYE REDUCTION CI BLUE 79 DYESTUFF | | |
| --- | --- | --- |
|  | POLYFON O (lignin with side-chain sulfonation) (%) | POLYFON O +1 mole of triethanolamine (%) |
| pH 4 | 12 | Below 0.5 |
| pH 5 | 17 | Below 0.5 |
| pH 6 | 85 | 1.5 |
| pH 7 | 100 | 64.0 |
| pH 8 | 100 | 100.0 |

Sulfomethylated lignin ammonium salt samples (prepared as described above by a two-step methylolation and ammonium sulfite reaction with the lignin of a kraft pulping process) were modified at various pH levels by the addition of 1 mole of triethanolamine and tested, as described above, for azo dye reduction with CI Blue 79 Dyestuff. The results of the tests were compared with azo dye reduction of an unmodified ammonium salt of the sulfomethylated lignin, and are set forth in the following table:

| AZO DYE REDUCTION CI BLUE 79 DYESTUFF | | |
| --- | --- | --- |
|  | SULFOMETHYLATED AMMONIUM SALT LIGNIN (%) | SULFOMETHYLATED AMMONIUM SALT LIGNIN + 1 MOLE OF TEOA (%) |
| pH 4 | 1.6 | Below 0.5 |
| pH 5 | 3.9 | Below 0.5 |
| pH 6 | 64.6 | Below 0.5 |
| pH 7 | 70.3 | 3.05 |
| pH 8 | 89.0 | 59.0 |

From a comparison of the data set forth in the foregoing tables, it can be seen that sulfonated lignin salt dispersants having a relatively high pKa value may be modified by addition of an amine compound having a lower pKa value to substantially alleviate color reduction effects of the dispersants in sensitive azo-containing dyestuff compositions.

That which is claimed is:

1. A method of producing a sulfonated lignin salt for use as a dispersant in azo dyestuff-containing dye systems comprising the step of modifying a sulfonated lignin salt by addition of an amine compound having a pKa value lower than the pKa value of the cation component of the sulfonated lignin salt, and combining the amine compound and sulfonated lignin salt to produce an ion exchange reaction and equilibrium therebetween.

2. A method as defined in claim 1 wherein the amine compound is added to the suflonated lignin salt in an amount of between about 0.1 to 2.5 moles per 1,000 grams of the lignin.

3. A method as defined in claim 2 wherein the sulfonated lignin salt of higher pKa cation value is selected from the group consisting of sodium and ammonium salts of a sulfomethylated lignin salt.

4. A method as defined in claim 3 wherein the sulfomethylated lignin salt is a sodium salt of the lignin.

5. A method as defined in claim 4 wherein the amine compound has a pKa value of less than about 9.6.

6. A method as defined in claim 3 wherein the sulfomethylated lignin salt is an ammonium salt of the lignin.

7. A method as defined in claim 6 wherein the amine compound has a pKa value of less than about 9.26.

8. A method as defined in claim 1 wherein the amine compound is selected from the group consisting of monoethanolamine. diethanolamine, and triethanolamine.

9. A method as defined in claim 8 wherein the amine compound is triethanolamine.

10. A method as defined n claim 1 including the step of adding the sulfonated lignin salt and the amine compound to an azo dyestuff as a dispersant therein.

11. A dyestuff composition containing an azo dyestuff and as a dispersant therein the ion-exchange reaction product of a sulfonated lignin salt having a relatively high pKa value and an amine compound having a pKa value lower than the pKa value of the cation component of the sulfonated lignin salt.

12. A product as defined in claim 11 wherein the amine compound is present in an amount in the dyestuff composition of between about 0.1 to 2.5 mole per 1,000 grams of the lignin.

13. A product as defined in claim 12 wherein the sulfonated lignin salt is a sodium salt, and wherein the amine compound is triethanolamine.

14. A dyestuff dispersant comprising the ion-exchange reaction product of a sulfonated lignin salt and an amine compound having a pKa value lower than the pKa value of the cation component of the sulfonated lignin salt.

15. A product as defined in claim 14 wherein the sulfonated lignin salt is a sodium salt.

16. A product as defined in claim 15 wherein the sulfonated lignin is a sulfomethylated sodium salt.

17. A product as defined in claim 14 wherein the sulfonated lignin salt is a sulfomethylated lignin salt selected from the group consisting of sodium and ammonium salts, and wherein the amine compound is selected from the group consisting of mono-, di-, and triethanolamine.

* * * * *